US008335810B2

(12) United States Patent
Klein et al.

(10) Patent No.: US 8,335,810 B2
(45) Date of Patent: Dec. 18, 2012

(54) REGISTER-BASED SHIFTS FOR A UNIDIRECTIONAL ROTATOR

(75) Inventors: Anthony D. Klein, Raleigh, NC (US); Michael Scott McIlvaine, Raleigh, NC (US); Abdulhameed A. Manadath, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 1254 days.

(21) Appl. No.: 11/343,764

(22) Filed: Jan. 31, 2006

(65) Prior Publication Data
US 2007/0180008 A1 Aug. 2, 2007

(51) Int. Cl.
*G06F 7/00* (2006.01)
*G06F 15/00* (2006.01)

(52) U.S. Cl. ...................................................... 708/209
(58) Field of Classification Search .......... 708/200–209; 364/715–716, 768; 395/562
See application file for complete search history.

(56) References Cited

U.S. PATENT DOCUMENTS

| | | | | |
|---|---|---|---|---|
| 4,437,166 A | * | 3/1984 | O'Brien | 711/109 |
| 4,807,172 A | * | 2/1989 | Nukiyama | 708/209 |
| 5,381,423 A | * | 1/1995 | Turco | 714/762 |
| 5,640,578 A | * | 6/1997 | Balmer et al. | 712/221 |
| 5,751,614 A | | 5/1998 | Cohen | |
| 5,867,681 A | * | 2/1999 | Worrell et al. | 712/208 |
| 6,046,734 A | * | 4/2000 | Noguchi et al. | 345/213 |
| 6,687,262 B1 | | 2/2004 | Jin | |
| 7,149,767 B2 | * | 12/2006 | Busaba et al. | 708/651 |
| 2003/0235298 A1 | * | 12/2003 | Hanounik | 380/29 |

FOREIGN PATENT DOCUMENTS

| | | |
|---|---|---|
| EP | 0657802 | 6/1995 |
| JP | 1244527 A | 9/1989 |
| JP | 07325716 | 12/1995 |
| JP | 8006544 A | 1/1996 |

OTHER PUBLICATIONS

David Patterson and John Hennessy, Computer Organization and Design the Hardware/Software Interhace, Third Edition, 2005, p. 288.*

(Continued)

*Primary Examiner* — Chuong D Ngo
*Assistant Examiner* — Kevin G Hughes
(74) *Attorney, Agent, or Firm* — Peter Michael Kamarchik; Nicholas J. Pauley; Jonathan T. Velasco (57) ABSTRACT

A processor having a unidirectional rotator configured to shift or rotate data in one direction is disclosed. The processor also includes a control unit having logic configured to modify a shift value specified by a registered-based shift, or rotate, instruction in an opposite direction, the modified shift value being usable by the rotator to shift, or rotate, the data in the one direction, and thereby, generate the same result as if the data in the rotator had otherwise been shifted, or rotated, in the opposite direction by the shift value originally specified by the registered-based instruction. The control unit is further configured to bypass the logic and provide to the rotator a shift value specified by a register-based instruction to shift, or rotate, the data in the one direction.

35 Claims, 3 Drawing Sheets

OTHER PUBLICATIONS

David Patterson and John Hennessy, Computer Organization and Design, Elseview Inc, 2005, Third Edition, pp. 48-329.*

International Search Report—PCT/US07/061414—International Search Authority, European Patent Office—Jun. 8, 2007.

Written Opinion—PCT/US07/061414—International Search Authority, European Patent Office—Jun. 8, 2007.

International Preliminary Report on Patentability—PCT/US07/061414—International Search Authority, The International Bureau of WIPO, Geneva, Switzerland—Aug. 5, 2008.

* cited by examiner

FIG. 1

| A | B | C | D | E | F | G | H |
|---|---|---|---|---|---|---|---|

FIG. 2A

→ ROTATE RIGHT BY 2

| G | H | A | B | C | D | E | F |
|---|---|---|---|---|---|---|---|

FIG. 2B

← ROTATE LEFT BY 6

| G | H | A | B | C | D | E | F |
|---|---|---|---|---|---|---|---|

REGISTER-BASED SHIFTS FOR A UNIDIRECTIONAL ROTATOR

FIELD

The present disclosure relates generally to processors, and more specifically, to register-based shifts for a unidirectional rotator.

BACKGROUND

Processors are used extensively today in almost every electronic application. The processor controls the execution of program instructions, arithmetic functions, and access to memory and peripherals. In the simplest form, the processor executes program instructions by performing one or more arithmetic functions on data stored in memory. The arithmetic functions performed by the processor may vary depending upon the particular application. One type of arithmetic function that is commonly performed by the processor is a shifting or rotating operation. The shifting or rotating operation may be performed by a rotator and associated logic. A rotator is an arrangement of multiplexer elements that have their inputs and outputs connected together in such a way that the data is shifted down the line in response to a program instruction calling for a shift operation.

The specific shifting operation called for by the program instruction may vary. For example, the program instruction may require a logical shift wherein the data is moved a discrete number of bit positions with the excess bits being discarded and the result being padded with zeros. An arithmetic shift is similar to a logical shift except the sign bit is extended to the left in a right shift operation and zeros are added to the lower-order bit positions in a left shift operation.

A rotator may also be used to execute program instructions calling for a rotate operation. A rotate operation is similar to the shift operation, except that the rotate operation is circular. When a rotate instruction is implemented, the bits that are shifted out one end of the rotator are returned on the other end. Like shift instructions, rotate instructions can be to the left or right.

Because program instructions for shift and rotate operations can be bi-directional, some processors incorporate a discrete left rotator and a right rotator. However, incorporating both may consume additional power and require more area or space. Accordingly, there is a need in the art for a processor based rotator that can execute shift and rotate instructions in both the left and right directions. The processor based rotator should be configured to minimize the latencies of the shifting and rotating operations.

SUMMARY

One aspect of a processor is disclosed. The processor includes a unidirectional rotator configured to shift or rotate data in one direction, and a control unit having logic configured to modify a shift value specified by a registered-based shift, or rotate, instruction in an opposite direction, the modified shift value being usable by the rotator to shift, or rotate, the data in the one direction, and thereby, generate the same result as if the data in the rotator had otherwise been shifted, or rotated, in the opposite direction by the shift value originally specified by the registered-based instruction. The control unit is further configured to bypass the logic and provide to the rotator a shift value specified by a register-based instruction to shift, or rotate, the data in the one direction.

Another aspect of a processor is disclosed. The processor is a n-bit unidirectional rotator configured to shift or rotate data in one direction, and a control unit having logic configured to modify a shift value m specified by a registered-based shift, or rotate, instruction in an opposite direction, the modified shift value being usable by the rotator to shift, or rotate, the data in the one direction by (n−m). The control unit is further configured to bypass the logic and provide to the rotator a shift value specified by a register-based shift, or rotate, instruction in the one direction.

One method of performing a shift or rotate operation using a unidirectional rotator configured to shift or rotate data in one direction is disclosed. The method includes retrieving a shift value specified by a registered-based shift, or rotate, instruction in the one direction, and bypassing logic and providing to the rotator the retrieved shift value. The logic is configured to modify a shift value specified by a registered-based shift, or rotate, instruction in an opposite direction, the modified shift value being usable by the rotator to shift, or rotate, the data in the one direction, and thereby, generate the same result as if the data in the rotator had otherwise been shifted, or rotated, in the opposite direction by the shift value originally specified by the registered-based instruction, Another method of performing a shift or rotate operation using a n-bit unidirectional rotator configured to shift or rotate data in one direction is disclosed. The method includes retrieving a shift value specified by a registered-based shift, or rotate, instruction in the one direction, and bypassing logic and providing to the rotator the retrieved shift value. the logic is configured to modify a shift value specified by a registered-based shift, or rotate, instruction in an opposite direction, the modified shift value being usable by the rotator to shift, or rotate, the data in the one direction by (n−m).

It is understood that other embodiments of the present disclosure will become readily apparent to those skilled in the art from the following detailed description, wherein it is shown and described only various embodiments by way of illustration. As will be realized, other and different embodiments are possible and the several details contained herein are capable of modification in various other respects, all without departing from the spirit and scope of the present disclosure. Accordingly, the drawings and detailed description are to be regarded as illustrative in nature and not as restrictive.

BRIEF DESCRIPTION OF DRAWINGS

These, as well as other features will now become clear from a review of the following detailed description of illustrative embodiments and the accompanying drawings wherein.

DETAILED DESCRIPTION

The detailed description set forth below in connection with the appended drawings is intended as a description of various embodiments of the present disclosure and is not intended to represent the only embodiments in which the present disclosure may be practiced. The detailed description includes specific details for the purpose of providing a thorough understanding of the present disclosure. However, it will be apparent to those skilled in the art that the present disclosure may be practiced without these specific details. In some instances, well known structures and components are shown in block diagram form in order to avoid obscuring the concepts of the present disclosure.

Figure 1:
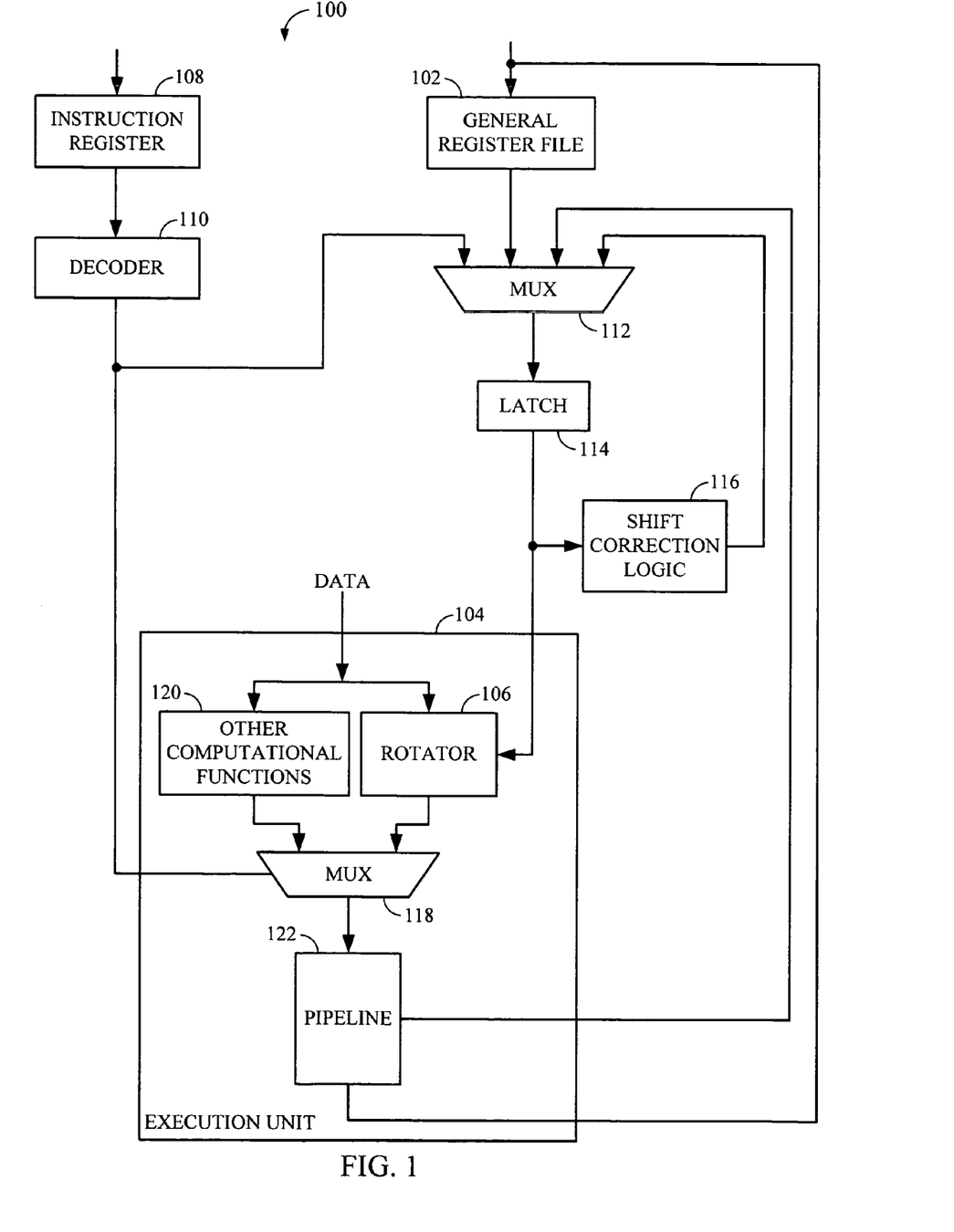
FIG. 1 is a simplified block diagram illustrating an example of a processor.

FIG. 1 is a simplified block diagram illustrating an example of a processor 100, or other computational system, capable of processing, retrieving and storing information. The processor 100 may be a stand-alone component, or alternatively, embedded in a device such as a computer, wireless telephone, personal digital assistant (PDA), digital camera, game console, or any other computational device. The processor 100 may be a microprocessor or other processing entity. In one embodiment, the processor 100 may be an embedded RISC microprocessor.

The primary function of the processor 100 is to execute program instructions by performing a host of operations on data. The data may be retrieved and stored in register files 102 in general purpose memory internal to the processor 100. The register files 102 are high-speed registers used for temporarily storing data from external memory. They provide low-latency access to data required by the processor 100. The number of registers 102 (commonly referred to collectively as a general register file) is specified by the processor architecture. Each register is accessible by an execution unit 104 to enable the processor 100 to read data from one or more selected registers, execute on the data, and write the result to a selected register.

The execution unit 104 uses an ALU (Arithmetic/Logic Unit), or other computational entities, to perform all mathematical operations of the processor 100. It is generally comprised of complex circuitry that performs various functions including addition, subtraction, multiplication, division, and other calculations. The execution unit 104 may also be used to shift or rotate data. The shifting and rotating functions can be performed with a unidirectional rotator 106 and associated logic (not shown) in the execution unit 104.

The rotator 106 shown in FIG. 1 will be described as a unidirectional rotator capable of shifting or rotating data any number of positions to the right. Those skilled in the art will readily appreciate the functionality of the rotator 106 described throughout this disclosure extends to unidirectional rotators that shift or rotate data to the left.

Figure 2A:
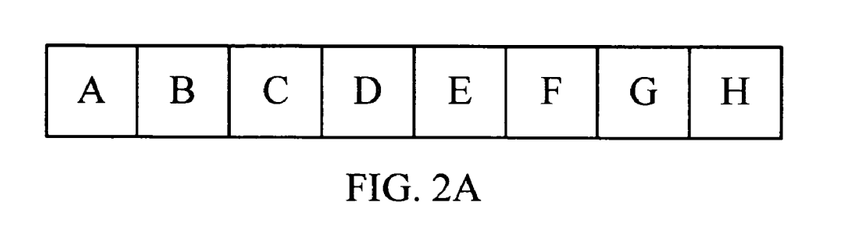
FIGS. 2A-2C are graphical illustrations showing the operation of a rotator in a processor.
Figure 2B:
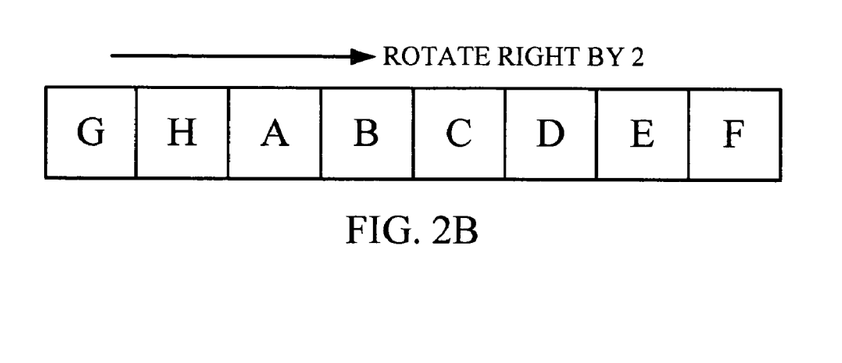
Figure 2C:
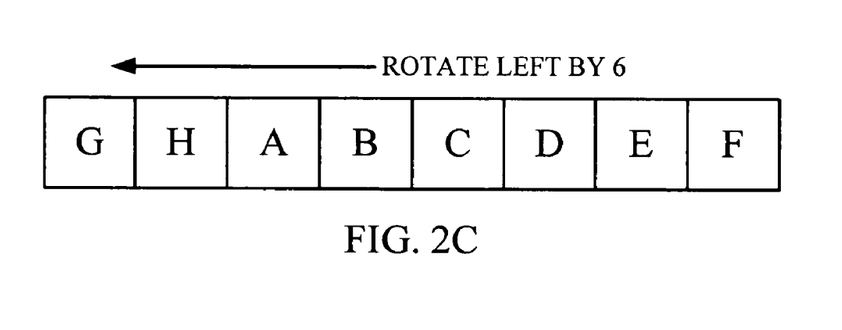

The operation of the rotator will be illustrated with reference to FIGS. 2A-2C. In FIG. 2A, the contents of an 8-bit rotator 202 is shown. The data in the 8-bit rotator may be rotated to the right by 2-bits, with the results shown in FIG. 2B. Referring to FIGS. 2B and 2C, one can readily see that a rotate right operation by 2-bits produces the same result as a rotate left operation by 6-bits. In other words, a rotator capable of rotating data in one direction can be used to emulate the rotation of data in the opposite direction. Thus, a rotate left operation by m-bits in a n-bit unidirectional rotator can be performed by rotating the data right by (n−m)-bits.

A shift operation may be performed by first rotating the data by the appropriate amount in the rotator and then discarding the appropriate bits. The unoccupied bit-positions may be padded with zeros, or in the case of a arithmetic shift right operation, the sign-bit may be extended to the left into the unoccupied bit positions. For example, a shift left operation by m-bits may be performed by rotating the data in the rotator by (n−m)-bits to the right, discarding the m-LSBs, and padding the m-LSB bit-positions with zeros. A shift right operation by m-bits may be performed by rotating the data in the rotator by m-bits to the right, discarding the m-MSBs, and padding the M-MSB bit-positions with zeros. In the case of a arithmetic shift right operation, the sign-bit may be extended left into the M-MSB bit-positions in the rotator.

Returning to FIG. 1, the operation of the execution unit 104 is controlled by program instructions stored in an instruction cache 108. The instruction cache 108 is small high speed memory on the processor 100. It provides temporary high speed storage for program instructions fetched from external memory. The program instructions are provided to a decoder 110 and the decoded instructions used to activate the execution unit 104 to perform mathematical operations.

Program instructions generally comprise of two parts: the op-code and the operand field. The op-code specifies the operation to be performed by the execution unit 104, such as add, subtract, store, rotate, shift, etc. The operand field provides more detail about the operation specified by the op-code. For example, in the case of a shift operation, the operand field indicates which register in the general register file 102 contains the data to be shifted, the direction of the shift, and the number of bit positions to shift the data. In this example, the operand field may call for the data in a first register to be shifted to the right by m-bits. Alternatively, the operand field may call for the data in a first register to be shifted by an amount specified in a second register. The former program instruction is commonly referred to as an "instruction-based shift," and the latter program instruction referred to as a "register-based shift."

A control unit (not shown) is responsible for directing the flow of program instructions and data within the processor. One of the control unit's many functions is to provide the data specified in the operand field of a arithmetic instruction to the execution unit 104. The data may be provided from any source depending on the architecture of the processor. For example, the data may be in the general register file 102, cache, or other memory. In some instances, the data may be in the pipeline 122 of the execution unit 104, and therefore, must be retrieved by the control unit and fed back to the input of the execution unit 104. The control unit may employ certain logic that allows it to recover data early from any stage in the pipeline 122. The control unit is generally implemented with a complex arrangement of decoders, multiplexers, and associated logic. In FIG. 1, the decoder 110, multiplexers 112, 118, latch 114, and shift correction logic 116 form part of the control unit.

In addition to controlling the flow of data into the execution unit 104, the control unit is also responsible for providing the op-code of the program instructions in the instruction cache 108 to the multiplexer 118 in the execution unit 104. The multiplexer 118 is used to switch the output of the rotator 106, or some other computational function 120, down the pipeline 122 before the control unit stores the result in the general register file 102. In the case of an instruction-based shift or rotate instruction, the operand field is routed through the multiplexer 112 and provided to the rotator 106 to tell it how many bit-positions to shift the data. The decoder 110, or other entity, may be used to convert a left shift, or rotate, to a right shift, or rotate, instruction by modifying the shift amount by (n−m).

The decoding function just described is well suited for instruction-based shifts or rotates because the instructions are available in the instruction cache 108 well in advance of execution by the processor 100. However, in the case of register-based shifts, or rotates, certain latencies can be experienced if the data specifying the shift amount for a current shift or rotate instruction is not in the general file register 102, but somewhere in the pipeline 122 of the execution unit 104.

In at least one embodiment of the processor 100, the control unit may be configured to efficiently process registered-based shift and rotate instructions. For example, the function of modifying the shift value for a shift or rotate instruction may be performed by the control unit, rather than the decoder 110, for a registered-based shift, or rotate, instruction. More specifically, the operand field for a registered-based shift, or rotate, instruction may provided to the control unit. The control unit locates the shift value specified by the operand field, either in the general file register 102 or the pipeline 122 of the execution unit, and delivers the shift value to the input of the latch 114 through the multiplexer 112. Once the data is delivered to the input of the latch 114, the control unit determines whether to load the data into the execution unit 104 on the following clock cycle, or first modify the shift value.

Figure 3:
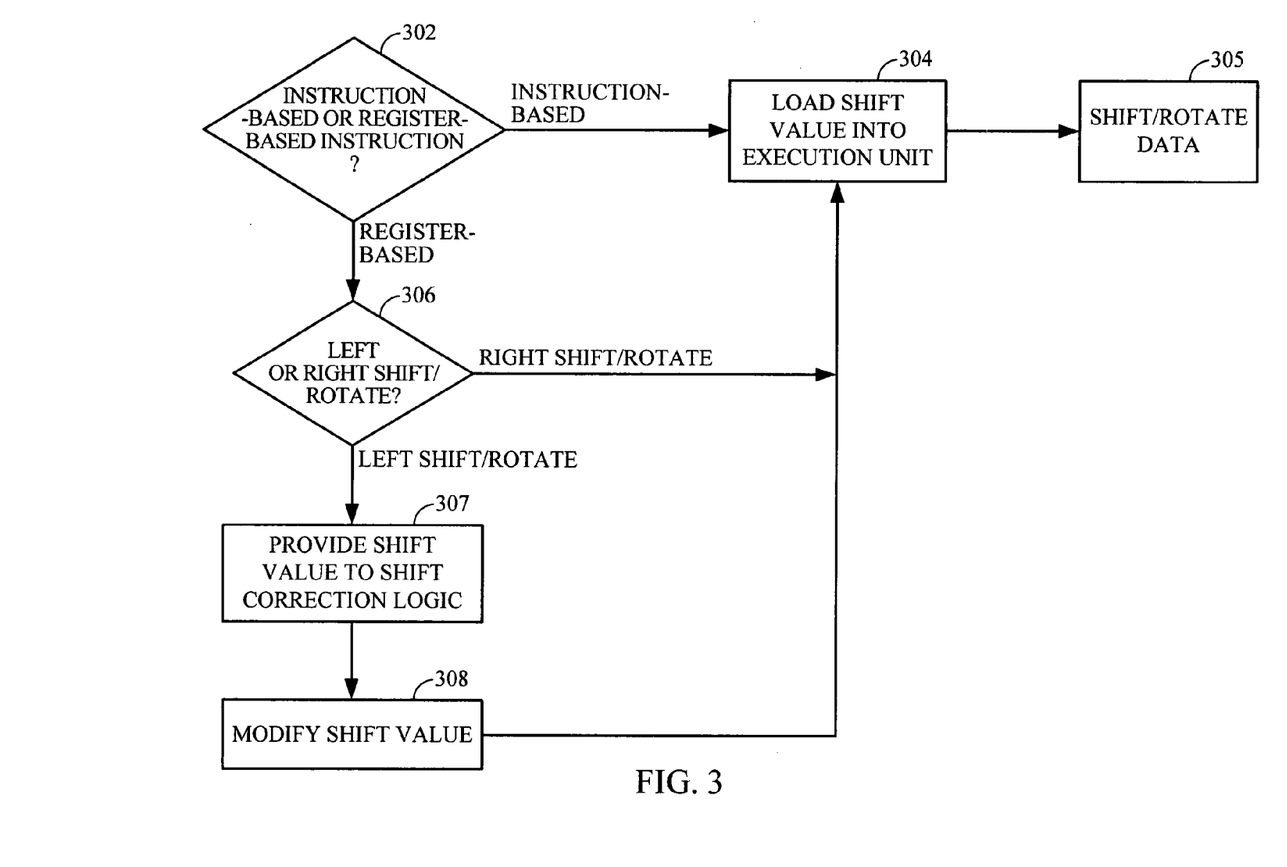
FIG. 3 is a flow chart diagram illustrating the operation of a control unit in a processor.

The process of delivering the shift value to the execution unit for a shift or rotate instruction will be described with reference to FIGS. 1 and 3. The control units determines whether the instruction is registered-based or instruction-based in step 302. If the control unit determines that the instruction is instruction-based, then the shift value is provided to the execution unit 104 in block 304, and the execution unit 104 shifts or rotates the data in the rotator to the right by an amount specified by the shift value in block 305. The shift value may have been modified previously by the decoder 110, or some other entity, if the instruction-based shift or rotate instruction was to the left.

If the control unit determines that the instruction is a registered-based instruction, then it determines whether the registered-based instruction calls for a right or left shift, or rotate, operation in block 306. If the control unit determines the instruction calls for a right shift, or rotate, operation, then the shift value is provided to the execution unit 104 in block 304, and the execution unit 104 shifts or rotates the data in the rotator to the right by an amount specified by the shift value in block 305.

If the control unit determines that instruction is a registered-based instruction to the left, then the shift value is provided to the shift correction logic 116 in block 307. In block 308, the shift value is modified by (n−m), where n is the size of the rotator 106 and m is the shift value. The modified shift value is provided to the execution unit 104 in block 304, and the execution unit 104 shifts or rotates the data in the rotator to the right by an amount specified by the shift value in block 305.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A processor comprising:
   a decoder for decoding instructions and activating an execution unit to perform mathematical operations, wherein the execution unit comprises:
      an Arithmetic Logic Unit (ALU) for performing mathematical operations of the processor;
      a unidirectional rotator configured to shift or rotate data in one direction; and
      a first multiplexer responsive to the decoder activation, wherein the first multiplexer switches the output of the ALU and the unidirectional rotator to a pipeline including a plurality of stages;
   a general register file for storing data from memory;
   a second multiplexer configured to select a shift value to shift or rotate the data in the one direction from one of a first input responsive to the general register file, a second input responsive to the pipeline, a third input responsive to the decoder, and a fourth input responsive to a shift correction logic;
   a control unit configured to determine whether an instruction is a first register-based instruction to shift or rotate the data in the one direction, a second register-based instruction to shift or rotate the data in an opposite direction, or an instruction-based shift or rotate instruction that includes a number of bit positions to shift the data;
   the shift correction logic configured to modify the shift value when the instruction is the second register-based instruction, the modified shift value being usable by the unidirectional rotator to shift or rotate the data in the one direction by the modified shift value to generate the same result as if the data in the unidirectional rotator had otherwise been shifted or rotated in the opposite direction by the shift value; and
   a latch including an input responsive to the second multiplexer and an output coupled to the shift correction logic, wherein the latch is configured to receive the shift value and is further configured to selectively provide the shift value to one of the shift correction logic and the unidirectional rotator to selectively bypass the shift correction logic, and wherein the shift correction logic is bypassed in response to a determination of the control unit that the instruction is the first register-based instruction to shift or rotate the data in the one direction or the instruction-based shift or rotate instruction.

2. The processor of claim 1, wherein the execution unit includes the pipeline, the control unit being further configured to recover the shift value from a stage of the plurality of stages of the pipeline, other than an output stage.

3. The processor of claim 1, wherein the modified shift value generated by the shift correction logic is fed back to the multiplexer, the second multiplexer being further configured to selectively provide one of the selected shift value and the modified shift value to the unidirectional rotator.

4. The processor of claim 1, wherein an output of the unidirectional rotator is delivered to the second multiplexer from the pipeline before the control unit stores the output in the general register file.

5. The processor of claim 1, wherein the second input of the second multiplexer is coupled directly to an output of the pipeline.

6. The processor of claim 1, wherein the second multiplexer is configured to receive an output of the unidirectional rotator from the pipeline via a path that does not include the general register file.

7. The processor of claim 6, wherein the path includes the first multiplexer.

8. A processor, comprising:
 a decoder for decoding instructions and activating an execution unit to perform mathematical operations, wherein the execution unit comprises:
  an Arithmetic Logic Unit (ALU) for performing mathematical operations of the processor;
  an n-bit unidirectional rotator configured to shift or rotate data in one direction; and
  a first multiplexer responsive to the decoder activation, wherein the first multiplexer switches the output of the ALU and the n-bit unidirectional rotator to a pipeline including a plurality of stages;
 a general register file for storing data from memory;
 a second multiplexer configured to select a shift value m to shift or rotate the data in the one direction from one of a first input responsive to the general register file, a second input responsive to the pipeline, a third input responsive to the decoder, and a fourth input responsive to a shift correction logic;
 a control configured to determine whether an instruction is a first register-based instruction to shift or rotate the data in the one direction, a second register-based instruction to shift or rotate the data in an opposite direction, or an instruction-based shift or rotate instruction that includes a number of bit positions to shift the data and that indicates a direction to shift or rotate the data;
 the shift correction logic configured to modify the shift value m when the instruction is the second register-based instruction, wherein the decoder is configured to modify the shift value when the instruction is the instruction-based shift or rotate instruction that indicates that the direction to shift or rotate the data is the opposite direction, the modified shift value being usable by the n-bit unidirectional rotator to shift or rotate the data in the one direction by the modified shift value to generate the same result as if the data in the n-bit unidirectional rotator had otherwise been shifted or rotated in the opposite direction by the shift value m, wherein the modified shift value is determined as n-m; and a latch including an input responsive to the second multiplexer and an output coupled to the shift correction logic, wherein the latch is configured to receive the shift value m and is further configured to selectively provide the shift value m to one of the shift correction logic and the n-bit unidirectional rotator to selectively bypass the shift correction logic, and wherein the shift correction logic is bypass in response to a determination of the control unit that the instruction is the first register-based instruction to shift or rotate the data in the one direction or the instruction-based shift or rotate instruction that indicates the direction to shift or rotate the data is the one direction.

9. The processor of claim 8, wherein the control unit is further configured to recover the shift value m from a stage of the plurality of stages of the pipeline, other than an output stage via the second multiplexer.

10. The processor of claim 8, wherein the control unit is further configured to provide the shift value m selected by the second multiplexer to the n-bit unidirectional rotator for the first register-based instruction, and to provide the shift value m selected by the second multiplexer to the shift correction logic for the second register-based instruction.

11. The processor of claim 10, wherein the modified shift value generated by the shift correction logic is fed back to the multiplexer, the second multiplexer being further configured to selectively provide one of the selected shift value m and the modified shift value to the n-bit unidirectional rotator.

12. A method of performing a shift or rotate operation using a unidirectional rotator configured to shift or rotate data in one direction by a shift value and shift correction logic configured to modify the shift value, the method comprising:
 decoding instructions at a decoder and activating an execution unit to perform mathematical operations at one of an Arithmetic Logic Unit (ALU) and the unidirectional rotator;
 switching a first multiplexer responsive to the activation, wherein the first multiplexer switches the output of the ALU and the unidirectional rotator to a pipeline including a plurality of stages;
 switching a second multiplexer configured to select the shift value from one of a first input responsive to a general register file for storing data from memory, a second input responsive to the pipeline, a third input responsive to the decoder, and a fourth input responsive to the shift correction logic;
 determining at a control unit whether an instruction is a first register-based instruction to shift or rotate the data in the one direction, a second register-based instruction to shift or rotate the data in the opposite direction, or an instruction-based shift or rotate instruction that includes a number of bit positions to shift or rotate the data and that indicates a direction to shift or rotate that data;
 modifying the shift value at the shift correction logic when the instruction is the second register-based instruction, the modified shift value being usable by the unidirectional rotator to shift or rotate the data in the one direction by the modified shift value to generate the same result as if the data in the unidirectional rotator had otherwise been shifted or rotated in the opposite direction by the shift value;
 modifying the shift value at the decoder when the instruction is the instruction-based shift or rotate instruction that indicates that the direction to shift or rotate the data is the opposite direction, the modified shift value being usable by the unidirectional rotator to shift or rotate the data in the one direction by the modified shift value to generate the same result as if the data in the unidirectional rotator had otherwise been shifted or rotated in the opposite direction by the shift value; and receiving the shift value at a latch including an input responsive to the second multiplexer and an output coupled to the shift correction logic and selectively providing the shift value to one of the shift correction logic and the unidirectional rotator to selectively bypass the shift correction logic, wherein the shift correction logic is bypassed in response to a determination of the control unit that the instruction is the first register-based instruction to shift or rotate the data in the one direction or the instruction-based shift or rotate instruction that indicates the direction to shift or rotate the data is the one direction.

13. The method of claim 12, wherein the shift value is retrieved from a stage of the plurality of stages of the pipeline, other than an output stage.

14. The method of claim 12, further comprising switching the second multiplexer to select a second shift value in response to a subsequent register-based instruction, and providing to the unidirectional rotator the second shift value.

15. A method of performing a shift or rotate operation using an n-bit unidirectional rotator, the method comprising:
decoding instructions at a decoder and activating an execution unit to perform mathematical operations at one of an Arithmetic Logic Unit (ALU) and the n-bit unidirectional rotator, wherein the n-bit unidirectional rotator is configured to shift or rotate data in one direction;
switching a first multiplexer responsive to the decoder activation, wherein the first multiplexer switches the output of the ALU and the n-bit unidirectional rotator to a pipeline including a plurality of stages;
switching a second multiplexer configured to select the shift value m from one of a first input responsive to a general register file for storing data from memory, a second input responsive to the pipeline, a third input responsive to the decoder, and a fourth input responsive to a shift correction logic;
modifying the shift value m at the shift correction logic, the modified shift value being usable by the n-bit unidirectional rotator to shift or rotate the data in the one direction by the modified shift value to generate the same result as if the data in the n-bit unidirectional rotator had otherwise been shifted or rotated in the opposite direction by the shift value m, wherein the modified shift value is determined a n-m,
receiving the shift value m at a latch, the latch including an input responsive to the second multiplexer and an output coupled to the shift correction logic and selectively providing the shift value m to one of the shift correction logic and the n-bit unidirectional rotator to selectively bypass the shift correction logic;
determining at a control unit whether an instruction is a first register-based instruction to shift or rotate the data in the one direction, a second register-based instruction to shift or rotate the data in the opposite direction, or an instruction-based shift or rotate instruction that includes a number of bit positions to shift the data and that indicates a direction to shift or rotate the data, wherein the shift value m is modified by the decoder when the instruction is the instruction-based shift or rotate that indicated the direction to shift or rotate the data is the opposite direction, wherein the modified shift value is determines as n-m; and bypassing the shift correction logic in response to a determination of the control unit that the instruction is the first register-based instruction to shift or rotate the data in the one direction or the instruction-based shift or rotate instruction that indicates the direction to shift or rotate the data is the one direction.

16. The method of claim 15, wherein the shift value m is retrieved from a stage of the plurality of stages of the pipeline, other than an output stage, of the execution unit.

17. The method of claim 15, wherein the shift value m is retrieved from the general file register.

18. The method of claim 15, further comprising switching the second multiplexer to select a second shift value in response to a subsequent instruction, and providing the second shift value to the n-bit unidirectional rotator.

19. A processor, comprising:
a decoder for decoding instructions for activating an n-bit unidirectional rotator;
the n-bit unidirectional rotator configured to shift or rotate data in one direction and provide the shifted or rotated data to a pipeline, wherein the pipeline includes a plurality of stages;
a general register file for storing data from memory;
a multiplexer configured to select a shift value m to shift or rotate the data in the one direction from one of a first input responsive to the general register file, a second input responsive to the pipeline, a third input responsive to the decoder, and a fourth input responsive to a shift correction logic;
a control unit configured to determine whether an instruction is a first register-based instruction to shift or rotate the data in the one direction, a second register-based instruction to shift or rotate the data in the opposite direction, or an instruction-based shift or rotate instruction that includes a number of bit positions to shift the data and that indicates a direction to shift or rotate the data;
the shift correction logic configured to modify the shift value m when the instruction is the second register based instruction, the modified shift value being usable by the n-bit unidirectional rotator to shift or rotate the data in the one direction by the modified shift value to generate the same result as if the data in the n-bit unidirectional rotator had otherwise been shifted or rotated in the opposite direction by the shift value m, wherein the modified shift value is determined as n-m; and
a latch including an input responsive to the multiplexer and an output coupled to the shift correction logic, wherein the latch is configured to receive the shift value m and is further configured to selectively provide the shift value m to one of the shift correction logic and the n-bit unidirectional rotator,
wherein the shift correction logic is bypassed in response to a determination of the control unit that the instruction is the first register-based instruction to shift or rotate the data in the one direction or the instruction-based shift or rotate instruction that indicates the direction to shift or rotate the data is the one direction, and
wherein the decoder is configured to modify the shift value m when the instruction is the instruction-based shift or rotate instruction that indicates that the direction to shift or rotate the data is the opposite direction, wherein the modified shift value is determined as n-m.

20. A method comprising:
decoding instructions at a decoder and activating a unidirectional rotator configured to shift or rotate data in one direction by a shift value m and to provide the shift or rotated data to a pipeline that includes a plurality of stages;

switching a multiplexer configured to select the shift value m from one of a first input responsive to a general register file for storing data from memory, a second input responsive to the pipeline, a third input responsive to the decoder, and a fourth input responsive to shift correction logic;

modifying the shift value m at the shift correction logic, the modified shift value being usable by the n-bit unidirectional rotator to shift or rotate the data in the one direction by the modified shift value to generate the same result as if the data in the n-bit unidirectional rotator had otherwise been shifted or rotated in the opposite direction by the shift value m, wherein the modified shift value is determined as n-m;

receiving the shift value m at a latch, the latch including an input responsive to the multiplexer and an output coupled to the shift correction logic and selectively providing the shift value m to one of the shift correction logic and the n-bit unidirectional rotator to selectively bypass the shift correction logic; and determining at a control unit whether an instruction is a first register-based instruction to shift or rotate the data in the one direction, a second register-based instruction to shift or rotate the data in the opposite direction, or an instruction-based shift or rotate instruction that includes a number of bit positions to shift the data, and bypassing the shift correction logic in response to a determination of the control unit that the instruction is the first register-based instruction to shift or rotate the data in the one direction or the instruction-based shift or rotate instruction, wherein the decoder is configured to modify the shift value m when the instruction is the instruction-based shift or rotate instruction, the modified shift value being usable by the unidirectional rotator to shift or rotate the data in the one direction by the modified shift value to generate the same result as if the data in the unidirectional rotator had otherwise been shifted or rotated in the opposite direction by the shift value m.

21. An apparatus comprising:
means for performing operations on data, wherein the means for performing operations on data comprises:
means for performing mathematical operations on the data;
means for shifting or rotating the data in one direction; and
means for switching an output of the means for performing mathematical operation and the means for shifting or rotating to a pipeline that includes a plurality of stages;
means for decoding instructions and activating the means for performing mathematical operations, wherein the means for switching is responsive to the means for decoding instructions and activating;
means for storing data; and
means for providing a shift value to one of a means for modifying the shift value and the means for shifting or rotating the data, wherein the shift value indicates a number of bit positions to shift or rotate the data in the one direction, wherein the means for providing the shift value further comprises:
means for determining whether an instruction is a first register-based instruction to shift or rotate the data in the one direction, a second register-based instruction to shift or rotate the data in an opposite direction, or an instruction-based shift or rotate instruction that includes a number of bit positions to shift the data; and
means for selecting the shift value, wherein the means for selecting the shift value includes a first input responsive to the means for storing data, a second input responsive to the pipeline, a third input responsive to the means for decoding, and a fourth input responsive to a means for modifying the shift value, and wherein the means for selecting the shift value selects the shift value from one of the first input, the second input, the third input, and the fourth input, wherein the means for providing the shift value provides the shift value to the means for modifying the shift value when the instruction is the second register-based instruction, wherein the modified shift value is usable by the means for shifting or rotating to shift or rotate the data in the one direction by the modified shift value to generate the same result as if the means for shifting or rotating had shifted or rotated the data in the opposite direction by the shift value, wherein the means for providing the shift value provides the modified shift value to the means for shifting or rotating when the instruction is the second register-based instruction, and wherein the means for providing the shift value provides the shift value to the means for shifting or rotating when the instruction is the first register-based instruction or the instruction-based shift or rotate instruction.

22. The apparatus of claim 21, wherein the means for providing the shift value further comprises means for recovering the shift value from a stage of the plurality of stages of the pipeline, wherein the stage is not an output stage.

23. The processor of claim 21, wherein the modified shift value is fed back to the means for selecting the shift value.

24. An apparatus comprising:
means for performing operations on data, wherein the means for performing operations on data comprises:
means for performing mathematical operations on the data;
means for shifting or rotating the data in one direction, wherein the means for shifting or rotating comprises n-bits; and
means for switching an output of the means for performing mathematical operation and the means for shifting or rotating to a pipeline that includes a plurality of stages;
means for decoding instructions and activating the means for performing mathematical operations, wherein the means for switching is responsive to the means for decoding instructions and activating;
means for storing data; and
means for providing a shift value m to one of a means for modifying the shift value m and the means for shifting or rotating the data, wherein the shift value m indicates a number of bit positions to shift or rotate the data in the one direction, wherein the means for providing the shift value m further comprises:
means for determining whether an instruction is a first register-based instruction to shift or rotate the data in the one direction, a second register-based instruction to shift or rotate the data in an opposite direction, or an instruction-based shift or rotate instruction that includes a number of bit positions to shift the data; and
means for selecting the shift value m, wherein the means for selecting the shift value m includes a first input responsive to the means for storing data, a second input responsive to the pipeline, a third input responsive to the means for decoding, and a fourth input responsive to a means for modifying the shift value, and wherein the means for selecting the shift value m selects the shift value m from one of the first input, the second input, the third input, and the fourth input, wherein the means for providing the shift value m provides the shift value m to the means for modifying the shift value m when the instruction is the second register-based instruction, wherein the modified shift value is determined as n-m, wherein the means for providing the shift value provides the modified shift value to the means for shifting or rotating when the instruction is the second register-based instruction, and wherein the means for providing the shift value m provides the shift value m to the means for shifting or rotating when the instruction is the first register-based instruction or the instruction-based shift or rotate instruction.

25. The apparatus of claim 24, wherein the means for providing the shift value m further comprises means for recovering the shift value m from a stage of the plurality of stages of the pipeline, wherein the stage is not an output stage.

26. The apparatus of claim 24, wherein the modified shift value generated by the means for modifying the shift value is provided to the fourth input of the means for selecting the shift value m.

27. A non-transitory computer-readable storage medium comprising instructions that, when executed by a processor, cause the processor to:

decode instructions at a decoder, wherein the decoder is configured to activate a first multiplexer to provide an output from one of an Arithmetic Logic Unit (ALU) and a unidirectional rotator to a pipeline that includes a plurality of stages, wherein the unidirectional rotator is configured to shift or rotate data in one direction by a shift value;

select, at a second multiplexer, the shift value from one of a first input of the second multiplexer that is responsive to a general register file for storing data from memory, a second input of the second multiplexer that is responsive to the pipeline, a third input of the second multiplexer that is responsive to the decoder, and a fourth input of the second multiplexer that is responsive to shift correction logic;

determine at a control unit whether an instruction is a first register-based instruction to shift or rotate the data in the one direction, a second register-based instruction to shift or rotate the data in the opposite direction, or an instruction-based shift or rotate instruction that includes a number of bit positions to shift or rotate the data and that indicates a direction to shift or rotate the data;

provide the shift value to the shift correction logic in response to a determination that the instruction is the second register-based instruction, wherein the shift correction logic generates a modified shift value that is usable by the unidirectional rotator to shift or rotate the data in the one direction by the modified shift value to generate the same result as if the unidirectional rotator had shifted or rotated the data in the opposite direction by the shift value;

provide the shift value to the unidirectional rotator in response to a determination that the instruction is the first register-based instruction or the instruction-based shift or rotate instruction; and provide the modified shift value to the unidirectional rotator in response to the determination that the instruction is the second register-based instruction.

28. The non-transitory computer-readable storage medium of claim 27, wherein the shift value is retrieved from a stage of the plurality of stages of the pipeline, wherein the stage is not an output stage.

29. The non-transitory computer-readable storage medium of claim 27, wherein the second multiplexer selects a second shift value in response to a subsequent register-based instruction and wherein the second shift value is provided to the unidirectional rotator.

30. A non-transitory computer-readable storage medium comprising instructions that, when executed by a processor, cause the processor to:

decode instructions at a decoder, wherein the decoder is configured to activate a first multiplexer to provide an output from one of an Arithmetic Logic Unit (ALU) and an n-bit unidirectional rotator to a pipeline that includes a plurality of stages, wherein the n-bit unidirectional rotator is configured to shift or rotate data in one direction by a shift value m;

select, at a second multiplexer, the shift value m from one of a first input of the second multiplexer that is responsive to a general register file for storing data from memory, a second input of the second multiplexer that is responsive to the pipeline, a third input of the second multiplexer that is responsive to the decoder, and a fourth input of the second multiplexer that is responsive to shift correction logic;

determine at a control unit whether an instruction is a first register-based instruction to shift or rotate the data in the one direction, a second register-based instruction to shift or rotate the data in the opposite direction, or an instruction-based shift or rotate instruction that includes a number of bit positions to shift or rotate the data and that indicates a direction to shift or rotate the data;

provide the shift value m to the shift correction logic in response to a determination that the instruction is the second register-based instruction, wherein the shift correction logic generates a modified shift value that is usable by the n-bit unidirectional rotator to shift or rotate the data in the one direction by the modified shift value to generate the same result as if the n-bit unidirectional rotator had shifted or rotated the data in the opposite direction by the shift value m;

provide the shift value m to the n-bit unidirectional rotator in response to a determination that the instruction is the first register-based instruction or the instruction-based shift or rotate instruction; and provide the modified shift value to the n-bit unidirectional rotator in response to the determination that the instruction is the second register-based instruction.

31. The non-transitory computer-readable storage medium of claim 30, wherein the shift value m is retrieved from a stage of the plurality of stages of the pipeline, wherein the stage is not an output stage.

32. The non-transitory computer-readable storage medium of claim 30, wherein the shift value m is retrieved from the general file register.

33. The non-transitory computer-readable storage medium of claim 30, further comprising instructions that, when executed by the processor, cause the processor to select a second shift value in response to a subsequent instruction and provide the second shift value to the n-bit unidirectional rotator.

34. An apparatus comprising:
- a control unit;
- an instruction register;
- a general register file; and
- an execution unit that includes an n-bit unidirectional rotator configured to shift or rotate data in one direction by a shift value and provide the shifted or rotated data to a pipeline, wherein the pipeline includes a plurality of stages, wherein the control unit is configured to:
- determine whether an instruction retrieved from the instruction register is a first register-based instruction to shift or rotate the data in the one direction, a second register-based instruction to shift or rotate the data in an opposite direction, or an instruction-based shift or rotate instruction that includes a number of bit positions to shift the data;
- select a shift value m to shift or rotate the data in the one direction from one of a first input responsive to the general register file, a second input responsive to the pipeline, a third input responsive to a decoder, and a fourth input responsive to a shift correction logic;
- modify the shift value m when the instruction is the second register based instruction, wherein the modified shift value is determined as n-m; and
- in response to a determination that the instruction is the first register-based instruction or the instruction-based shift or rotate instruction, provide the shift value m to the n-bit unidirectional rotator; and
- in response to a determination that the instruction is the second register-based instruction, provide the modified shift value to the n-bit unidirectional rotator.

35. A non-transitory computer-readable storage medium comprising instructions that, when executed by a processor, cause the processor to:
- determine, at a control unit of the processor, whether an instruction is a first register-based instruction to shift or rotate data in one direction, a second register-based instruction to shift or rotate the data in an opposite direction, or an instruction-based shift or rotate instruction that includes a number of bit positions to shift the data and that indicates a direction to shift or rotate the data;
- select a shift value m from one of a first input responsive to a general register file, a second input responsive to a pipeline, a third input responsive to a decoder, and a fourth input responsive to shift correction logic;
- modify the shift value m when the instruction is the second register based instruction, wherein the modified shift value is determined as n-m, wherein n corresponds to a number of bits in an n-bit unidirectional rotator; and
- in response to a determination at the control unit that the instruction is the first register-based instruction, provide the shift value m to the n-bit unidirectional rotator, wherein the n-bit unidirectional rotator is configured to shift or rotate the data in the one direction; and
- in response to a determination at the control unit that the instruction is the second register-based instruction or the instruction-based shift or rotate instruction, provide the modified shift value to the n-bit unidirectional rotator.

\* \* \* \* \*